United States Patent [19]

Kao

[11] 4,224,508
[45] Sep. 23, 1980

[54] ERROR CORRECTING BAR CODE READER

[75] Inventor: Charles T. Kao, Richardson, Tex.

[73] Assignee: Recognition Equipment Incorporated, Irving, Tex.

[21] Appl. No.: 959,978

[22] Filed: Nov. 13, 1978

[51] Int. Cl.² .................... G06K 5/00; G06K 9/18; G06K 19/06; G06K 7/10
[52] U.S. Cl. .................... 235/437; 235/462; 235/491; 340/146.3 Z
[58] Field of Search .......... 235/491, 462, 437; 340/146.3 Z; 250/566

[56] References Cited

U.S. PATENT DOCUMENTS

| | | | |
|---|---|---|---|
| 3,044,696 | 7/1962 | Feissel | 340/146.3 Z |
| 3,286,233 | 11/1966 | Lesueur | 340/146.3 Z |
| 3,354,432 | 11/1967 | Lamb | 340/146.3 Z |
| 3,538,500 | 11/1970 | Hanchett | 340/146.3 Z |
| 3,744,025 | 7/1973 | Bilgutay | 235/437 |
| 3,932,840 | 1/1976 | Hanchett | 235/437 |
| 4,053,737 | 10/1977 | Lefevers | 340/146.3 Z |
| 4,059,224 | 11/1977 | Seligman | 235/462 |

*Primary Examiner*—Robert M. Kilgore
*Attorney, Agent, or Firm*—John E. Vandigriff

[57] ABSTRACT

A low cost, high performance bar code reader is required for reading the CFC-6 character font. The character is printed in fluorescent bars which are coded by different spacing between each bar so that it can be machine readable. A special recognition logic is developed to read the font when it is data lifted by the analog front end. An error correction capability is built in to correct certain correctable errors such as a missing bar.

12 Claims, 7 Drawing Figures

ERROR CORRECTING BAR CODE READER

BACKGROUND OF THE INVENTION

This invention relates to document processing systems and more particularly to a system within a compact document transport for reading a CFC-6 bar code format which has an error correction capability to correct certain errors such as missing bars.

DESCRIPTION OF THE PRIOR ART

Commercially available transports for handling of documents up to now have been large and bulky and used for the high speed processing of documents without the capability of inputting information into the system. These prior art transports generally are for reading and sorting documents such as checks and for inputting information from them into the computer for later billing or sending out statements. Information is read from the documents by reading optically either alphanumeric or bar codes.

The present invention, however, relates to an error correcting bar code reading system in a compact document transport.

SUMMARY OF THE INVENTION

A Reader/Validator (R/V) is used to read the CFC-6 characters and perform error detection and error correction during reading. A system has been developed and is described below which performs the reading and error correction functions while the document is moving by transport at a speed of 25 IPS. A lamp illuminates the CFC-6 character and the video signal is picked up by a silicone sensor. The data lift electronics amplifies the video signal from the sensor and then detects the peak of the video signal, the peak information which normally implies the center of each vertical stroke of CFC-6 characters. An 8-bit binary counter counts the distance between 2 adjacent strokes and then inputs the count to the recognition logic which can be either a microprocessor system or a TTL logic. The recognition logic analyzes each individual interval count and then determines the polarity of the interval. After a whole character passes the data lift, the recognition logic will make a character decision based on the sequence of the 5 interval parities of the character. It is possible that due to poor printing or other reasons, a bar (vertical stroke) ink is so weak that it is undetected. Then an error condition is presented to be corrected.

The following drawings are used to illustrate the invention.

FIG. 1 is a representation of the functional portion of a transport on which the R/V optical sensor assembly is installed.

Figure 1:
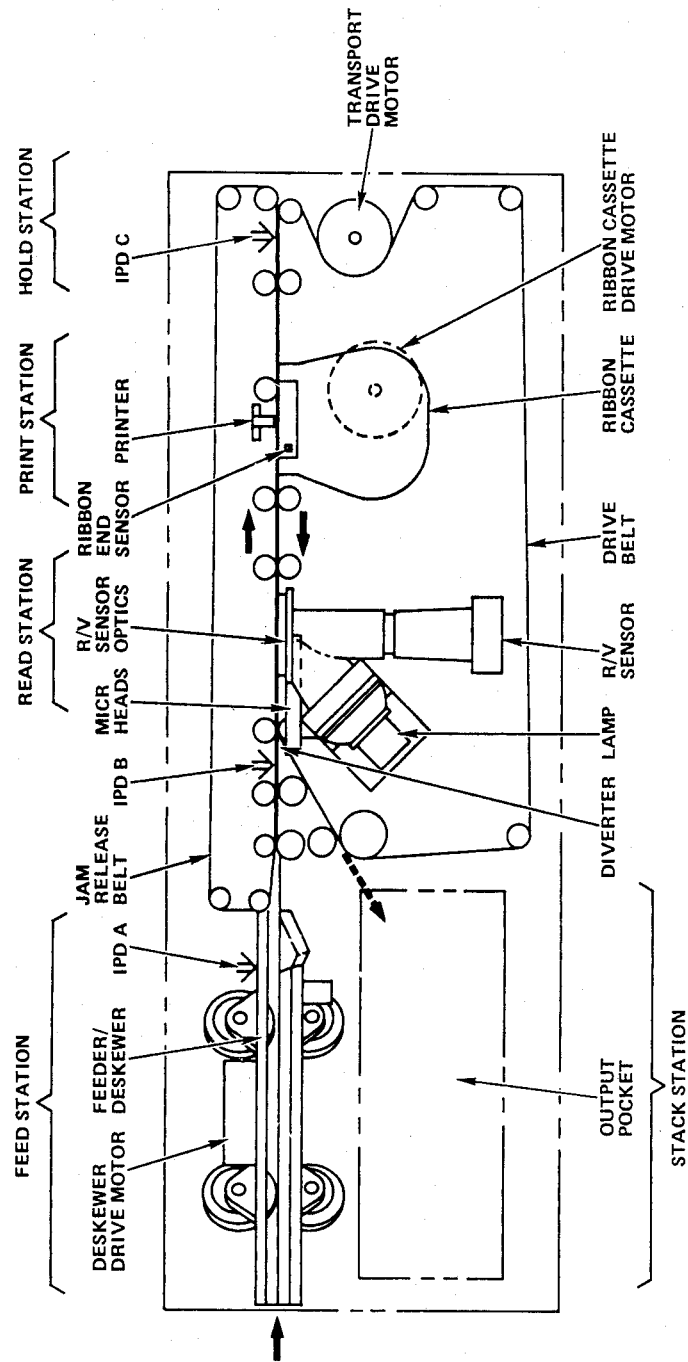
FIG. 1 is an illustration of the functional parts of a transport in which the Reader/Validator is installed.

As a document is dropped into the feeder, it is sensed by an item presence detector (IPD A) at the bottom of the feeder throat. The document is deskewed and advanced forward to the transport belts.

Acting on a timed signal from the feeder IPD, the transport drive motor is initiated and the belts move in a clockwise or left to right mode. The document is pinched between the jam release belt and the pinch roller as the belts accelerate up to a constant speed of 25 in./sec.

Just prior to the read station, the jam release belt engages the drive belt and the leading edge of the document is sensed by a second IPD (IPD B). This IPD starts a timing clock which tells the down range IPD (IPD C) when to expect the document.

The document passes the read station at constant speed where both E-13B magnetic characters and CFC-6 characters within bar code band (if present) are read.

If the document has been previously encoded with flourescent CFC-6 characters, the R/V reads and then sends the data to the central control system for storage. If there exists no information within the bar code band (approximately 2.125"±0.055 above document bottom), it is recognized as such and the document proceeds down the belt path.

The document continues to the right beyond the printer until the leading edge trips the third IPD which is expecting it. If the document fails to reach the third IPD within the expected time, a jam condition is indicated and the belts are stopped. After passing the third IPD, the transport drive motor stops momentarily and its direction is automatically reversed.

After the transport has transmitted all read data to the system, and received print data, the next operation is printing. If one field (15 characters) or less is to be printed, the motor will ramp up to the printing position and then start the stepping sequence. If printing between 16 and 27 characters, the drive motor steps immediately as to start printing.

As the document passes through the print station, it is encoded with a CFC-6 format (as described in U.S. patent application Ser. No. 854,954 filed Nov. 25, 1977) with a fluorescent ink which is transferred from the ¼ inch ribbon in the cassette. After each impact, the belts reposition the document at the precise location for the next impact while the print wheel motor repositions the print wheel for the next character.

After the last printed character, the transport drive motor ramps up to a constant speed of 25 in./sec. and moves the document past the read station in the reverse direction. In this mode, the bar acts as a validator to verify that the printer has properly encoded the document.

After passing through the read station, the document is gated away from the main belt path to the stacker pocket where it is deflected and gravity stacked. As the trailing edge of the processed document passes the second IPD, the transport motor is altered and the sequence may start again.

Due to the fact that the same bar code reader is used as a reader or validator in this application, the bar code reader will be designated as Reader/Validator or simply R/V.

Figure 2:
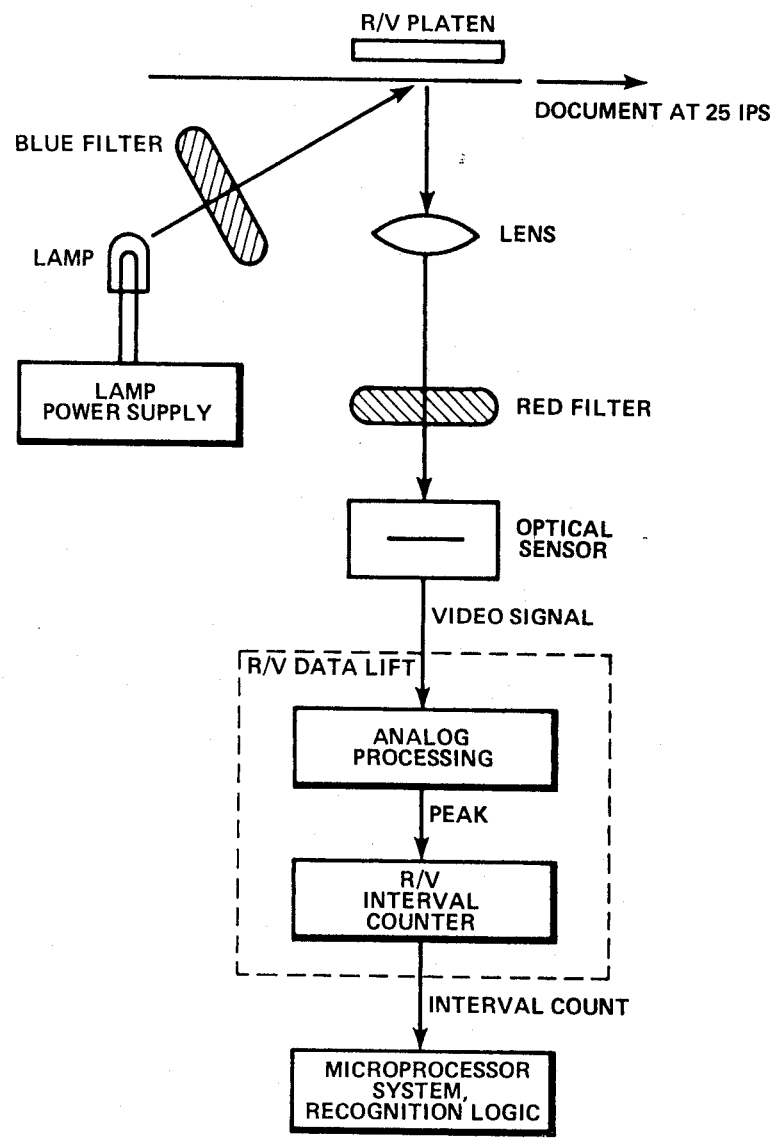
FIG. 2 is the R/V system block diagram.

FIG. 2 shows the block diagram of the R/V system.

As documents pass by the R/V station for either reading or validating, the reader basically looks for reflected energy levels from the fluorescent bars. By timing the occurrence of these energy levels (short space or long space) the reader discerns which character is present. Each character is exactly the same total width with 3 short and 2 long intervals. The arrangement of the short (S) and long (L) spaces denotes a specific character. For example:

| Bar Spacing | Character ID |
|---|---|
| SSLLS | 0 |
| SSLSL | 1 |
| SLLSS | 2 |
| SLSSL | 3 |
| SSSLL | 4 |
| LSSLS | 5 |
| LSLSS | 6 |
| LLSSS | 7 |
| LSSSL | 8 |
| SLSLS | 9 |

An extra long space indicates the end of one character and the beginning of another.

The lamp section of the reader is in continuous operation at a low output level until a document approaches. At this point the lamp brightens to full strength. The light is filtered once before striking the fluorescent bars on the document. The excited fluorescent bars emit energy that is reflected to a focusing lens at the front of the reader barrel. The lens focuses the energy on a second filter in front of a silicon detector which measures the energy and sends the information to the Reader/Validator data lift circuit.

A flexible back-up platen positioned on the jam release directly opposite the lens barrel flattens the document thus keeping the coded bars at a constant dimension from the focusing lens.

Figure 3A:
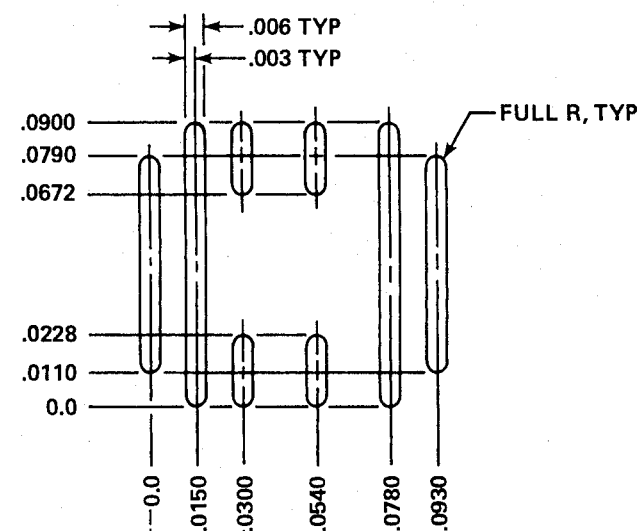
FIG. 3a illustrates the CFC-6 character "0" font.
Figure 3B:
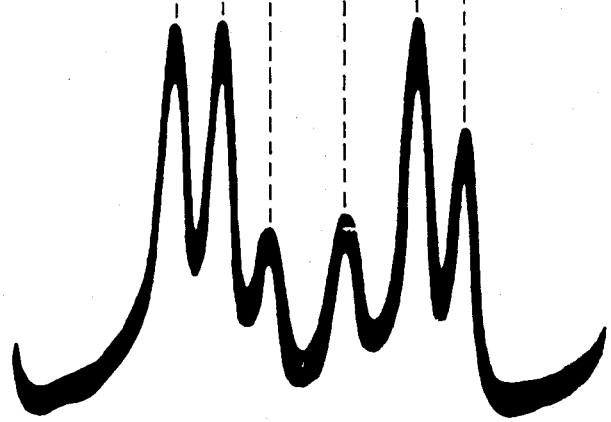
FIG. 3b illustrates the video signal from the R/V sensor for a typical CFC-6 character "0"

The analog processing part of the R/V Data Lift amplifies the video signal and then detects the peak of the video signal. An interval counter counts the time difference between 2 adjacent peaks which corresponds to the distance between 2 CFC-6 adjacent bars. Shown in FIG. 3b is the video signal waveform of a CFC-6 character "0." The CFC-6 character "0" dimension is shown in FIG. 3a.

It can be seen that the video signal amplitude varies with the bar size. However, the peak which corresponds to the average center of each bar is independent of the bar size. The interval counter is incremented at 40 microsecond clock. Since the transport runs at 25 IPS, each count thus represents $40 \times 25 \times 10^{-6} = 0.001$ inch in distance. The interval count is output to a microprocessor system where the character recognition and error correction logic is performed to read the character.

Figure 4:
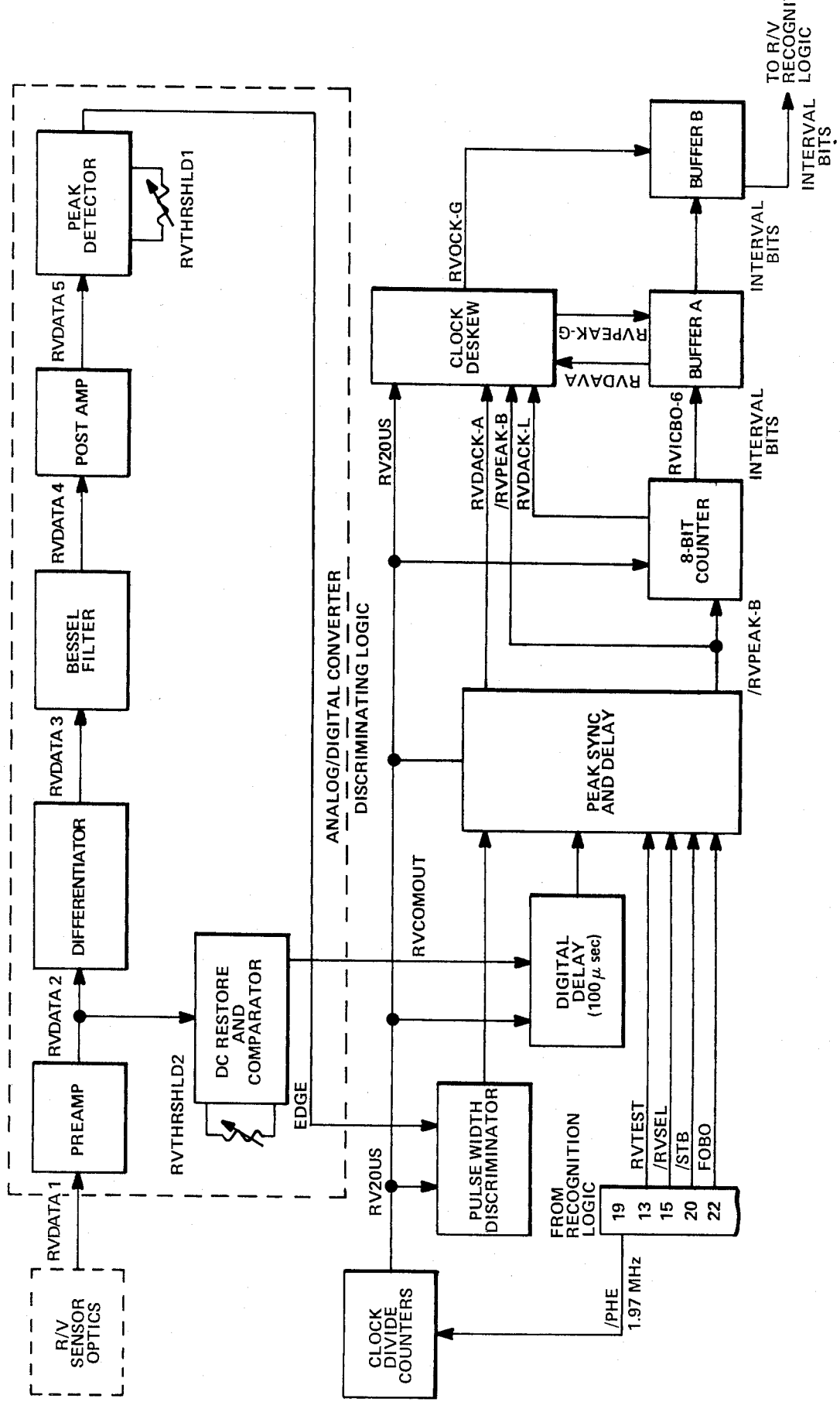
FIG. 4 is a block diagram of the Reader/Validator data lift circuit.

The R/V Data Lift Block Diagram is shown in FIG. 4.

The function of the Reader/Validator Data Lift is to convert the analog signal from the R/V Sensor which corresponds to fluorescent CFC-6 bar code to an interval code that represents the distance, in mils, between the bars of the character and between characters.

The Analog/Digital Converter is comprised of six sections. These are Preamplifier, Differentiator, Bessel Filter, Post Amplifier, Peak Detector, and DC Restore and Comparator.

The Preamplifier and its associated component, produce a gain of 3.9 and provides the input signal to the DC Restore and Comparator circuits and the Differentiator Circuit.

The positive going, zero crossing of the differentiated signal represents the peak of a bar of a CFC-6 character.

The differentiated signal is attenuated slightly by the Bessel Filter which is a three pole, low pass filter that has a constant time delay over the operating frequency range. In effect the device filters without distorting the pulse shape.

The signal is amplified by the Post Amplifier, which has a gain of 2.1, and then converted to digital information by the zero cross detector. Thus a peak detector is formed by differentiating and then zero cross deflecting. The negative-going zero crossing of the Post Amplifier output switches the detector output from low to high to correspond to the bars of the characters. The signal RVTHRSHLD1 is the peak detector threshold that provides for noise immunity adjustment and is set above the base-line noise level to prevent erroneous peak generation.

The function of the DC Restore and Comparator circuits is to remove the pedestal voltage ($V_p$) which is the voltage induced by the light reflections directly from the paper. Reference should be made in this particular instance to the preamplifier output signal RVDATA2 and in comparison the output of the DC Restore circuit which has the pedestal voltage removed.

The threshold on the Comparator is adjusted by a potentiometer for a minimum acceptable peak amplitude which will allow small peaks, from dim or partial bars, to be detected.

The main signal input to this section is EDGE. The first stage is the Width Discriminator which passes peak widths longer than 100 usec. A nominal bar width should generate a peak width of 300 usec.

The DC Restore and Comparator output (RVCMPOUT), is delayed 80 usec. to allow for the signal delay through the rest of the analog section. The signal PEAK is then generated by the output of the Width Discriminator clocking a D type flip-flop that is enabled by the output of the Digital Delay.

The signal RVTEST is a logic signal that enables software generated peak signals to be used for testing purposes. The signal FOBO is a software peak signal. These signals are used during cold start test to verify correct operation of the Reader. The signal PEAK is gated with the signals RVTEST and FOBO to control the source of the CFC-6 peak data. The signals /STB and /RVSEL are microprocessor controlled signals that are gated together to generate RVDACK which is a data acknowledge signal that is used in validation.

The signal PEAKCK is the controlled peak data that is input to the Peak Sync and Delay flip-flop which synchronizes the peak data with the clock signal RV20US and changes the data into one 20 usec clock width pulses. The signal RVPEAK-A is used for a look-ahead signal to the double buffering, and is also delayed by one clock pulse width to generate the signal RVPEAK-B.

The signal RVPEAK-B is used to load two cascaded synchronous, 4-bit binary counters that are preset with a count of two and clocked with the signal RV20US. These counters generate a 7-bit code that represents the interval between CFC-6 bars in mils (i.e., RVOB0 is 1 mil, RBOB1 is 2 mils, . . . RBOB6 is 64 mils). This interval bit code is then double buffered to ensure that microprocessor programming character decisions can be made fast enough to prevent misreading any character. The clock inputs to these double buffers are controlled by the signal RVDOCWNDO when the Reader/Validator logic is enabled.

Figure 5:
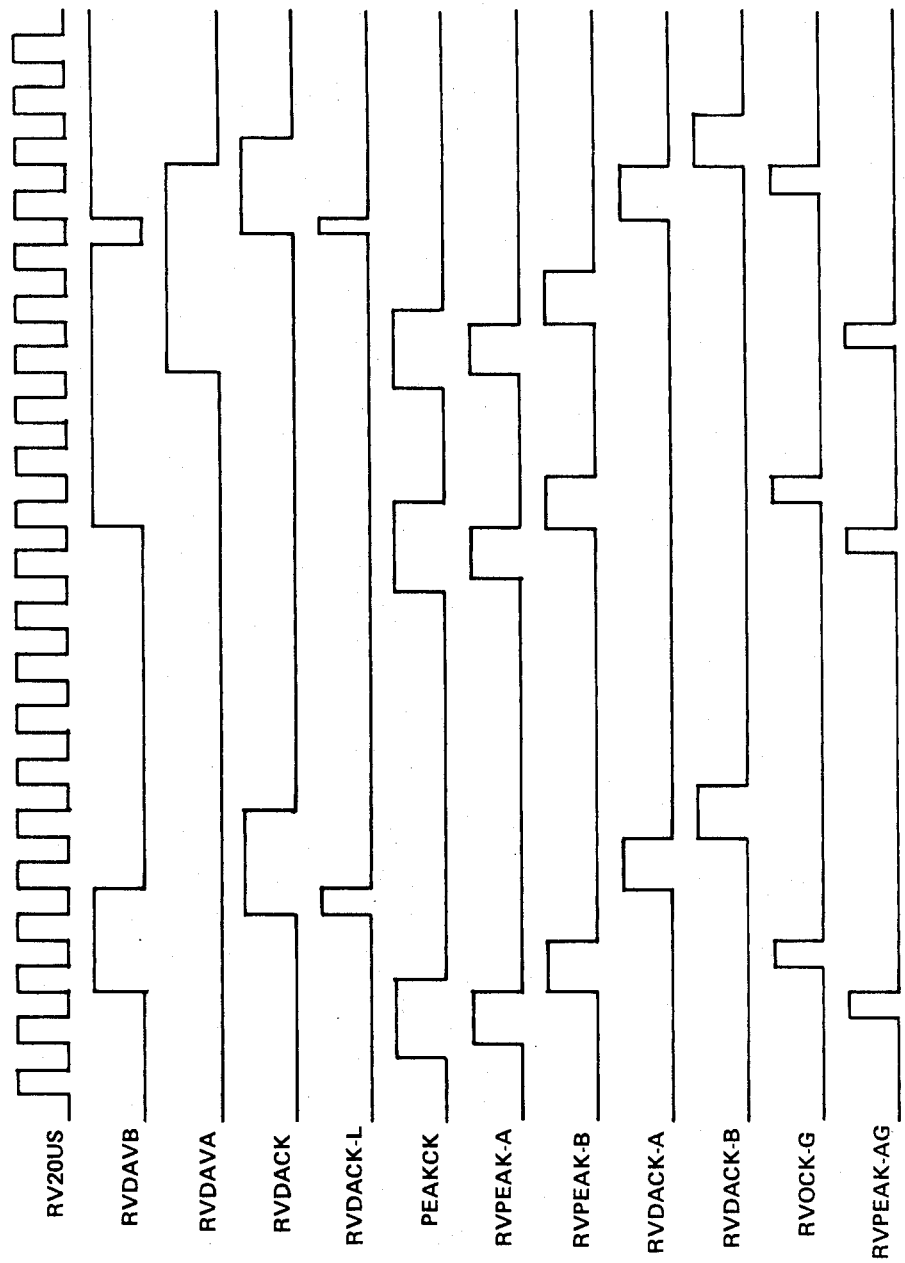
FIG. 5 is a timing diagram of the Reader/Validator data lift circuit.

A timing diagram showing the relationship of the various signals for the Reader/Validator logic is shown in FIG. 5.

Figure 6:
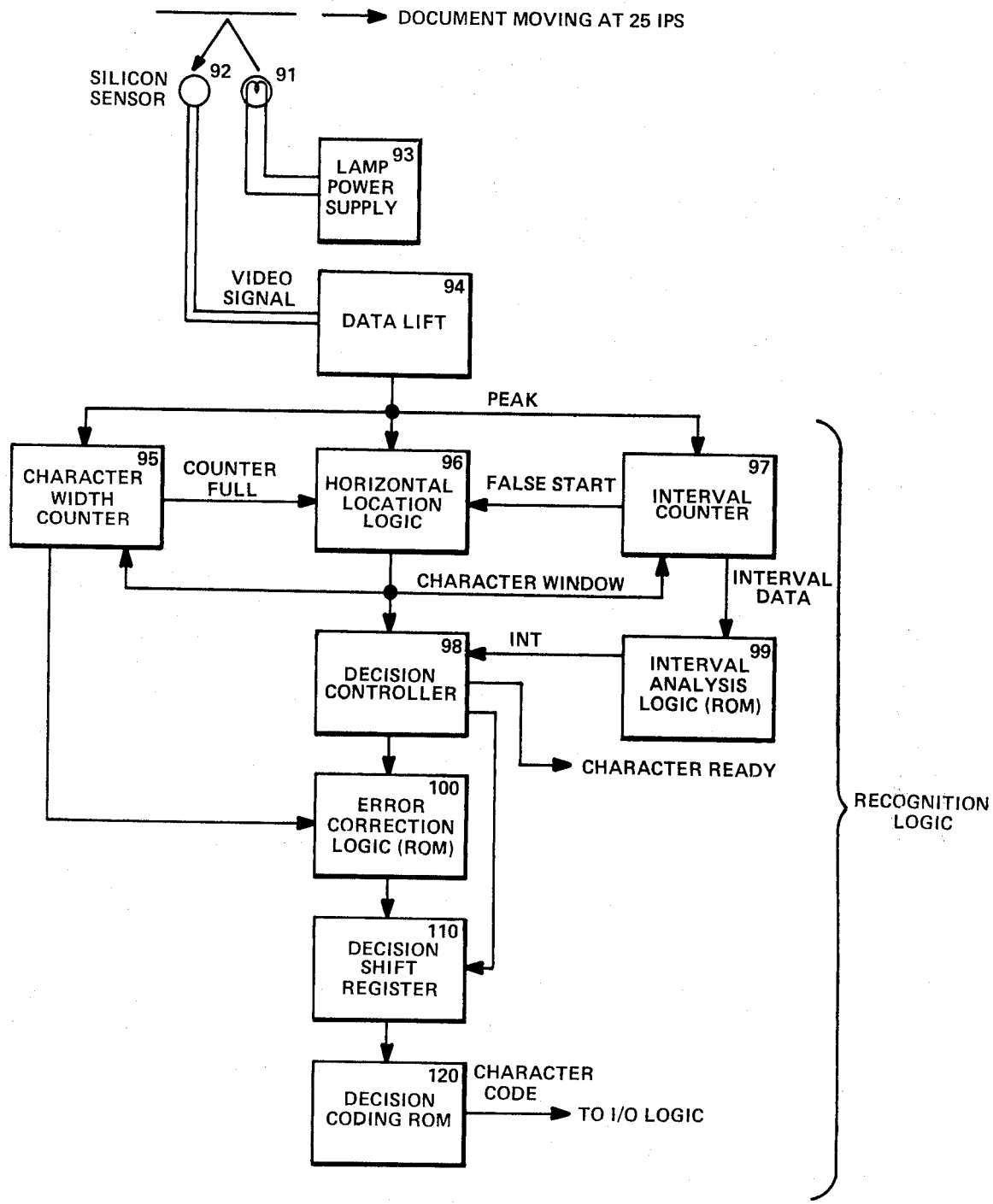
FIG. 6 is a block diagram of the Reader/Validator illustrating a TTL embodiment of the Reader/Validator recognition logic.

FIG. 6 illustrates a different implementation of the reader. Whereas the reader of FIG. 7 utilizes a microprocessor for the recognition logic, FIG. 9 illustrates a system which has been implemented in, for example, TTL logic.

The peak output of Data Lift 94 is leading to horizontal Location Logic 96 where a valid character is located. The Interval Counter 97 is an 8-bit counter to count the distance between two adjacent peaks. The character width counter 95 is also an 8 bits counter which counts the width of a detected character. The character window is reset if either the character width counter counts to a predetermined value or the interval counter counts to a value that "false start" condition is triggered.

The Interval data leads from Interval Counter 97 and is input to an Interval Analysis Logic where the interval spacing is analyzed to see if it is a normal "0" or "1" spacing, or it is too wide or too short than an error correction process is required.

The Decision Controller 98 receives data from Interval Analysis Logic 99 and character window signal from horizontal Location logic 96. Then it edits the information so that it can be analyzed by the Error Correction Logic 100 for final interval decision. The Error Correction Logic 100 examines the analyzed result from interval analysis ROM 99 to see if there is a need to do error correction. Since all the valid intervals have been found by interval analysis ROM 99, the Error Correction Logic 100 may then make a decision for those invalid intervals based on the knowledge of knowing how many valid intervals have been located because all CFC-6 characters can only have 2 long intervals (24±4 mils) and 3 short intervals (15±4 mils). For example, if a bar is missing between 2 long intervals, then the interval analysis ROM 9 can only find 3 short intervals. The Error Correction Logic 100 will be looking for any interval about 48 mil wide and then label it as 2 long intervals. Thus the missing bar is repaired (or inserted). It is the same way one or two bars are missing between short intervals (interval width will be 30 or 45 mil respectively).

Due to the fact that the CFC-6 character pitch is fixed at 150 mil, a missing first bar or last bar is also correctable. The error correction logic sums up all the intracharacter intervals and counts the number of bars (peaks) to determine if the end bar is missing. If the end bar is missing, then the error correction logic compares the leading or trailing edge intercharacter spacing to see if it is longer than normal. A nominal intercharacter span should be $150-(2\times24+3\times15)=57$ mil. If the first bar associated with a short interval is missing, the leading edge intercharacter space will be $57+15=72$ mil and thus a short interval will be entered by the error correction logic. All the error correction logic takes into consideration that each interval width can have a tolerance of ±4 mil. However, the accumulated interval width error of a character is limited to 12 mil. In other words, the character width should be within 93±12 mil.

The final interval decisions are then clocked into a decision shift register 110 by the Decision controller. At the end of the error correction/decision cycle, a coding ROM 120 converts CFC-6 character code into standard ASCII or other code for output and Decision Controller 98 outputs on "Character Ready" signal to indicate a character decision is made. This ROM also takes care of the CFC-6 character code difference because of document moving direction. For example, the bar spacing code of SSLLS implies a character 0 for "Reader" operation, the same code implies a character 2 for "Validator" operation because the document moves in a reverse direction for validation. By taking into consideration the direction of reading the CFC-6 code and thus the reader can read with the document moving in either forward or reverse direction providing an advantage over other bar codes and bar code readers.

It is possible that when a bar between a long and a short interval is missing, or not detectable, an invalid interval occurs which is not correctable, then a reject code will be output to indicate a misread or error.

Since the CFC-6 recognition logic operates on the interval data measured in mils, the logic is very adaptive to transports with speeds other than 25 IPS by simply modifying the interval counter counting clock frequency. For instance, if a transport speed runs at 10 IPS, the counter clock frequency should be $10/25=0.4$ times the original clock frequency. The rest of logic circuit remains the same.

Having described a preferred embodiment of the invention, further embodiments and modifications will be suggested to those skilled in the art, which embodiments and modifications are deemed to be within the scope of the invention as defined in the following claims.

What is claimed is:

1. An error detecting and correcting bar code character reader having a fixed number of vertical bars and a fixed number of spaces of different widths, comprising; means for determining the number of spaces between bars and the number of spaces of each width, means for determining the order of occurence of the spaces of each width, means for identifying the character based upon the order of spaces of each width and means for detecting when one or more bar is missing and supply the information normally supplied by the missing bar so that the character represented by the bars can be read.

2. The reader according to claim 1 wherein the fixed number of spaces is five and there are three of one width and two of another width.

3. The reader according to claim 1 wherein said means for detecting a character having one or more missing bar comprises; means for counting the spaces and measuring the intervals between bars means for comparing the count and measurement against a standard and determining which bar is missing, and means for supplying data representative of the missing bar.

4. The reader according to claim 2 including means for supplying a missing first bar or last bar.

5. An error detecting and correcting bar code reader for reading bar code characters, in either a forward or reverse direction, having a series of vertical bars variably spaced comprising; means for counting the number of bars in a character to determine if the correct number of bars is present, means for determining if the correct spacing occurs between bars, means for correlating the bar number and the bar spacing to identify the bar character, and means for correcting and supplying information concerning a missing bar when a bar is missing.

6. The reader according to claim 5 including means for detecting the absence of a bar or two bars in a bar code character and means for supplying the missing bar so that the character may be identified.

7. The reader according to claim 5 wherein the correct number of bars is 6 and that there are two different spacings between bars.

8. The reader according to claim 6 wherein the means for detecting the absence of a bar is an interval analysis circuit which determines if the spaces between bars are correct, a too wide or too short interval is indicative of a missing bar.

9. An error correcting system for a bar code character reading device comprising; means for counting the bars and measuring the intervals between bars, means for comparing the count and interval measurement against a standard, means for correcting said character by supplying a missing bar when said comparison indicates a missing bar, and means for identifying said character after said missing bar has been supplied.

10. A method of reading bar code characters and detecting missing bars wherein each and every character has the same fixed number of bars and the bars are spaced from each other with one of two set invervals, comprising the steps of; counting the number of bars and measuring the intervals between bars, comparing the count and interval measurement against a standard, and identifying the bar code character as compared against the standard, and detecting and identifying which of the bars are missing when a bar is missing.

11. The method according to claim 10 including the steps of adding a missing bar when the bar count and interval measurement indicates a bar is missing, and identify the character after the missing bar is added.

12. The method according to claim 10 including the step of inputting the direction of movement of the bar code character permitting the readings of the characters in either the forward or reverse direction.

* * * * *